Figure 1:
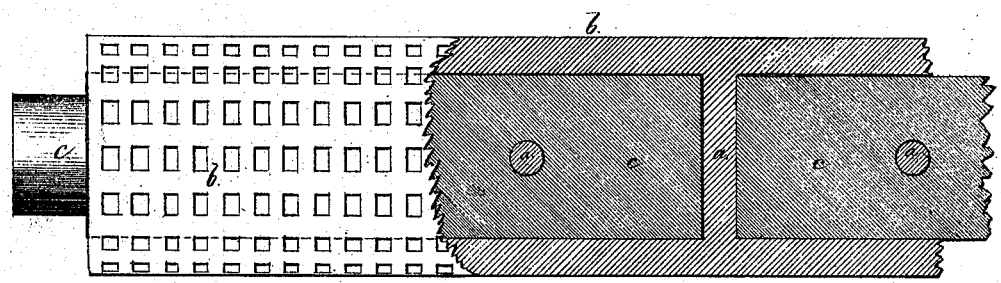

S. R. Kenyon,

Wringer Roll.

No. 106,175.   Patented Aug. 9. 1870.

Witnesses,
Chas. H. Smith
Harold Serrell

Silas R. Kenyon
per Lemuel W. Serrell
atty

United States Patent Office.

SILAS R. KENYON, OF GREENVILLE, RHODE ISLAND, ASSIGNOR TO HIMSELF AND WILLIAM D. VERNAM, OF ELIZABETH, NEW JERSEY.

Letters Patent No. 106,175, dated August 9, 1870.

IMPROVEMENT IN ATTACHING RUBBER TO WRINGER-SHAFTS.

The Schedule referred to in these Letters Patent and making part of the same.

To all whom it may concern:

Be it known that I, SILAS R. KENYON, of Greenville, in the county of Providence and State of Rhode Island, have invented a new and useful Improvement in Attaching Rubber to the Metal Shafts of Rollers, and the following is declared to be a correct description thereof.

Difficulty has been experienced in connecting rubber rollers to their metal shafts, so that the rollers cannot become loose or detached. Various plans have been adopted for effecting this object, especially in connection with the wringing-machine rollers.

My invention is adapted to rubber rollers generally, whether such rollers are employed in wringing-machines or in corn-husking machines, such as before patented by me, or in any other kind of machinery.

I bore or form several holes through the shaft transversely of the same, and at suitable distances apart, along such roller. Into these holes I introduce pieces of India rubber, of a length to project slightly from the surface. The ends of these pieces of rubber, shown at $a\ a$ in accompanying drawing, are to be coated with India-rubber cement. I prefer also that the surface of the said roller should be coated in the same manner.

Around the metal shaft thus prepared, sheet India rubber is to be wound, and then compressed into a metal mold, having a roughened or corrugated surface, so that the India rubber or gum is pressed firmly upon the shaft and the ends of the rubber pieces $a\ a$.

The roller is to be subjected to heat or vulcanized, while in the mold, so as to cause all the gum to become as one continuous mass, hence the blocks or pieces $a\ a$ become dowels to hold the rubber cylinder $b$ firmly upon the shaft $c$, and it is not possible to loosen the roller until these dowels are cut off, so that for all practical purposes the rubber roller and shaft become as one.

In the drawing—

Figure 2:
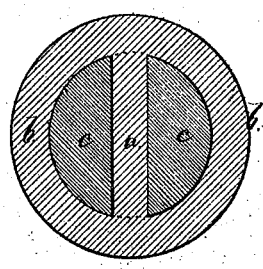

Figure 1 is a longitudinal section of the roller, and
Figure 2, a cross-section.

I claim as my invention—

1. The rubber dowels, passing into and through holes in the shaft, to connect the rubber cylinder to said shaft.

2. A rubber roller, having a corrugated surface, produced by the interior of the mold, in which the same is vulcanized.

Signed this 2d day of July, A. D. 1870.

SILAS R. KENYON.

Witnesses:
CHAS. H. SMITH,
GEO. T. PINCKNEY.